April 28, 1942.    H. C. HETTELSATER    2,281,288
BRAKING SYSTEM
Filed Feb. 6, 1941    3 Sheets-Sheet 1
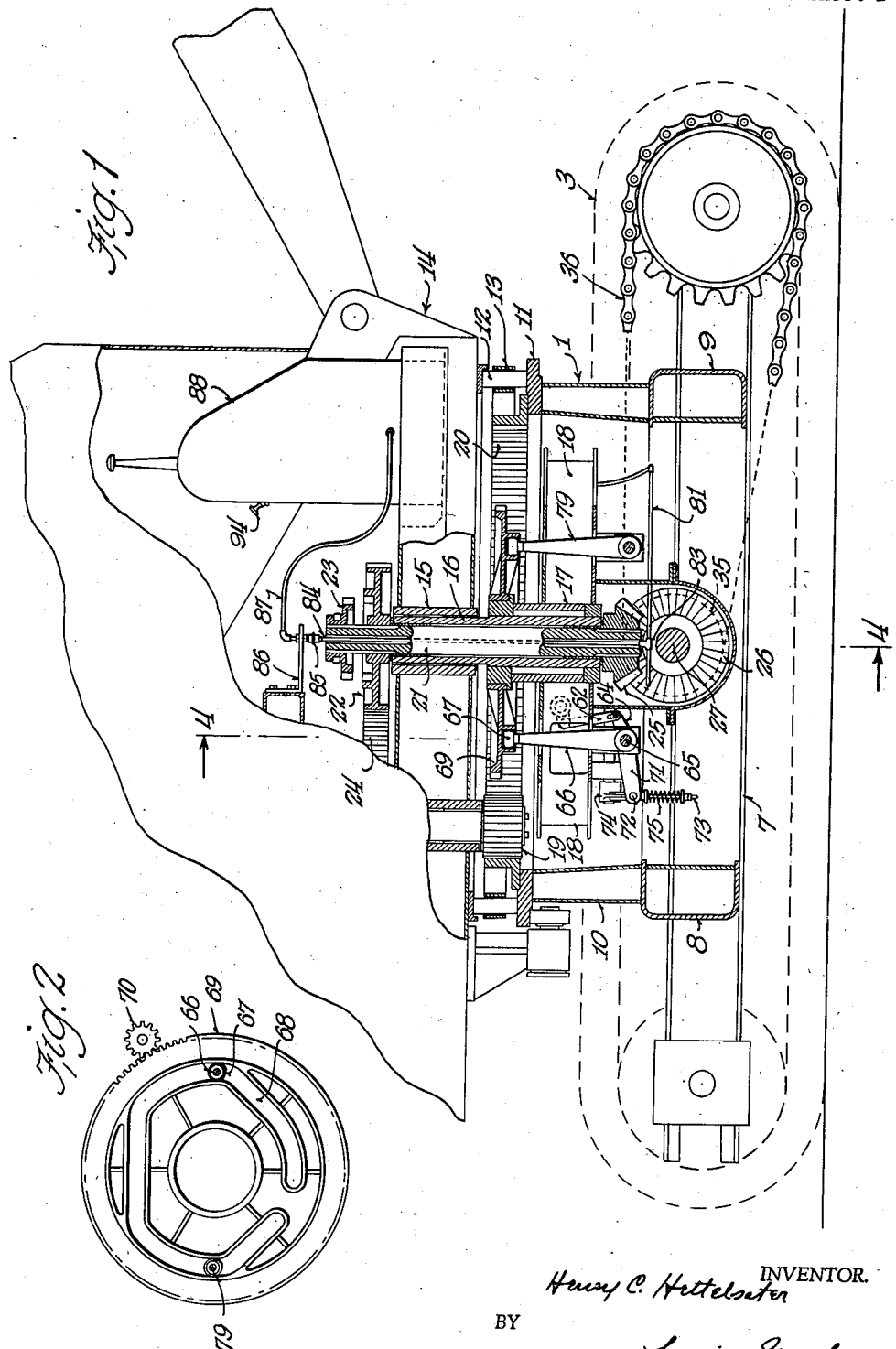
INVENTOR.
Henry C. Hettelsater
BY
Louis Quarles
ATTORNEY April 28, 1942.  H. C. HETTELSATER  2,281,288

BRAKING SYSTEM

Filed Feb. 6, 1941  3 Sheets-Sheet 2

INVENTOR.
Henry C. Hettelsater
BY
Louis Quarles
ATTORNEY

April 28, 1942.    H. C. HETTELSATER    2,281,288
BRAKING SYSTEM
Filed Feb. 6, 1941    3 Sheets-Sheet 3
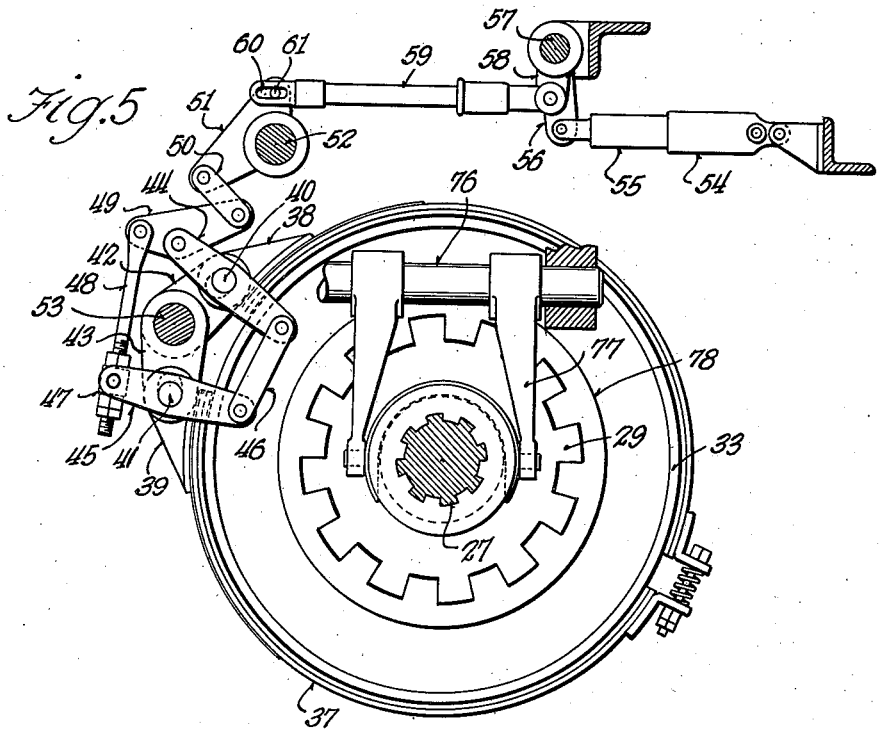
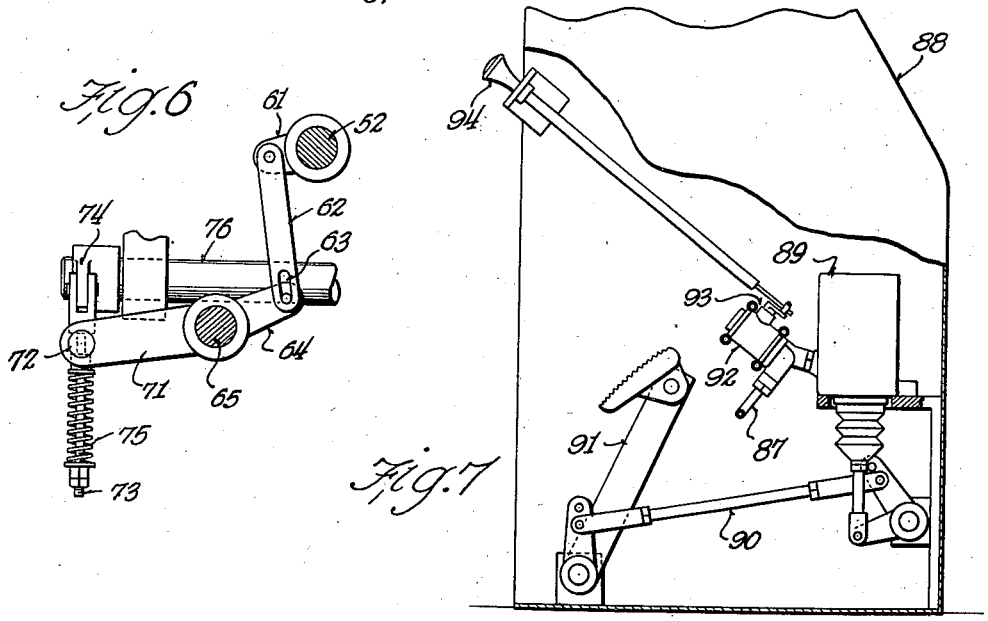
INVENTOR.
Henry C. Hettelsater
BY
Louis Quarles
ATTORNEY Patented Apr. 28, 1942

2,281,288

UNITED STATES PATENT OFFICE 2,281,288

BRAKING SYSTEM

Henry C. Hettelsater, Milwaukee, Wis., assignor to Harnischfeger Corporation, Milwaukee, Wis., a corporation of Wisconsin Application February 6, 1941, Serial No. 377,644

13 Claims. (Cl. 180—9.2)

This invention relates to braking mechanism suitable for use in an excavator or other device having a car body upon which there is mounted a rotatable driving and control cab. In such apparatus the transmission of driving power and the communication of control for steering and braking from the cab to the car body without unduly encumbering the rotatable mounting of the cab presents a difficult problem for solution. As a result, prompt and immediate selection of the several control functions required has been sacrificed to permit simplification of the control linkages employed. In the usual case, shifting of the controls from forward driving position to braking position, or either of the turning positions, requires that the operator stop the machine and operate control wheels or levers. Each such change requires a substantial fraction of a minute or more. Under circumstances where it is necessary or desirable to quickly release or set brakes great difficulty is experienced.

One object of this invention is to provide a braking system for a machine of the type herein described in which brakes may be applied and released quickly so that if a machine starts to descend an incline "run away" of the machine may be quickly and promptly controlled.

Another object of this invention is to provide in an excavating machine a braking and driving system such that moving up of the machine and the setting of digging brakes during digging operation may be accomplished with a minimum of delay, thus enhancing the output of such machine.

Another object of this invention is to provide a semi-independent braking system in addition to the braking system employed in connection with the steering of machines of the type herein described which may be relied upon in case of failure of said conventional brakes, thus increasing the safety of such machines.

Another object of this invention is to provide a braking system for machines of the type herein described which may be installed in a manner which little encumbers the rotatable mounting of the cab.

The above and other advantages and objects of this invention will become apparent from the description which follows, which is set forth herein in conjunction with the drawings which form a part hereof and in which there is set forth by way of illustration and not of limitation one form of the apparatus of this invention.

In the drawings:

Fig. 1 is a side elevation showing a car body partly in outline and a fragment of a rotating cab mounted thereon, shown broken away and in section to expose the brake system of this invention;

Fig. 2 is a detail plan view from below of the control cam shown in Fig. 1;

Fig. 5 is a detailed side view of a clutch and brake assembly;

Fig. 6 is a detailed view of a fragment of the brake-and-clutch-operating linkage; and Fig. 7 is a detailed view showing an hydraulic pressure-generating means employed in this invention.

Figure 4:
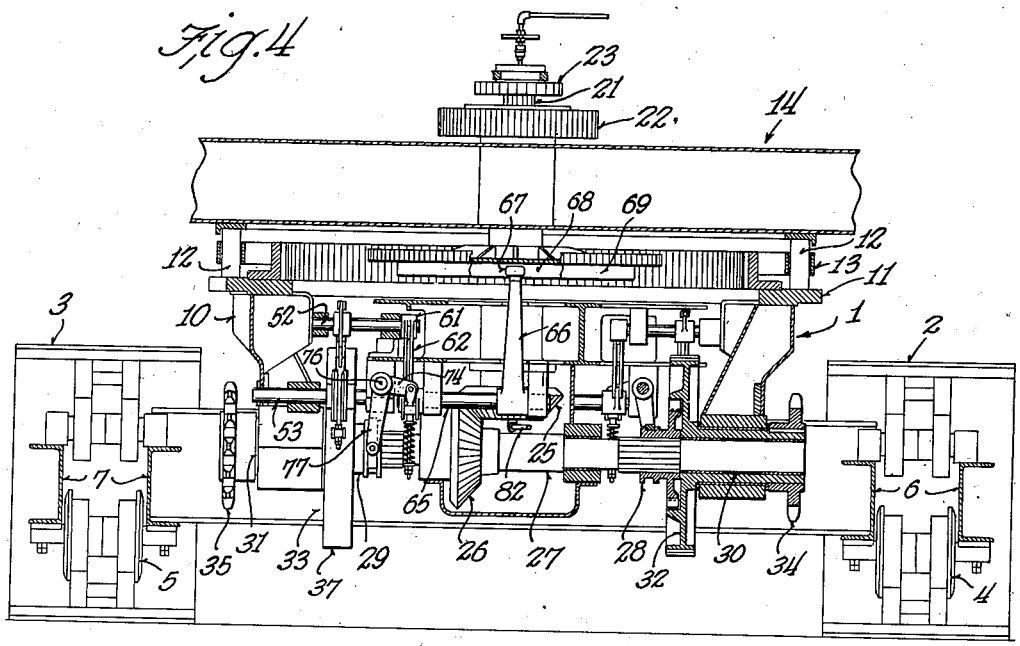
Fig. 4 is an end elevation in section, viewed through the broken plane 4—4 indicated in Figs. 1 and 3 of the car body and a fragment of the control cab shown in Fig. 1.
Figure 3:
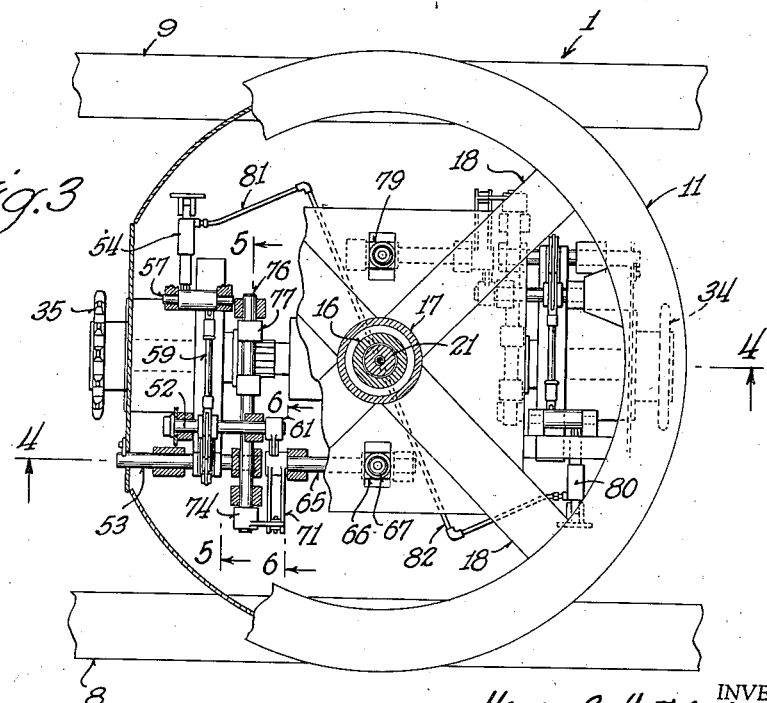
Fig. 3 is a plan view with portions broken away and in section of a fragment of the car body shown in Fig. 1.

Referring now to the drawings, there is shown in Figs. 1, 3, and 4, a car body designated generally by the numeral 1, upon which there are mounted right and left tractor treads 2 and 3, respectively. The treads 2 and 3 pass in the usual manner around end sprockets and are supported by the track rollers 4 and 5, which in turn are journalled upon the stringers 6 and 7 which form an integral part of car body 1. Joining the stringers 6 and 7 are cross-members 8 and 9 which furnish support for the pedestal 10 which carries at its upper end the roller track 11. A race of rollers 12, held in spaced relationship by retainer bars 13, is mounted in the usual manner to turn upon the roller track 11 and to furnish a rotatable support for the rotatable cab designated generally by the numeral 14.

The rotatable cab 14 is provided with a center bushing 15, which is mounted to turn upon the center gudgeon 16. The gudgeon is securely held in the mounting-sleeve 17, which in turn is rigidly attached to the pedestal 10 by the spokes 18. The cab 14 is thus rotatably mounted in conventional manner upon the car body 1 and rotation of the cab is produced by drive transmitted, from means not shown and forming no part of this invention, through pinion 19 to internal ring gear 20 with which the pinion meshes.

Driving power for the treads 2 and 3 is transmitted from the control cab 14 downwardly through the hollow center gudgeon 16 by means of the hollow vertical driving shaft 21, drive being communicated thereto through the loose gear 22 and the dog-clutch 23. Power to drive the gear 22 is derived through the gear 24 from means not shown and forming no part of this invention.

Secured to the lower end of the vertical driving shaft 21 to turn therewith is a bevel pinion 25, which meshes with the bevel gear 26. The bevel gear 26 is secured to the subaxle 27 which is journalled, as shown more clearly in Fig. 4, upon an extension of the car body 1. The two ends of the subaxle 27 terminate in splined portions upon which there are slidably mounted right- and left-hand dog-clutches 28 and 29, respectively. Positioned in alignment with and mounted beyond the ends of the subaxle 27 are the sprocket spindles 30 and 31 on the inner ends of which there are integrally formed right- and left-hand brake drums 32 and 33, respectively. The sprocket spindles 30 and 31 are journalled in extensions of the pedestal 10, as shown clearly in Fig. 4, and upon the outer ends of said sprocket spindles there are secured the sprocket pinions 34 and 35. In the hubs of the brake drums 32 and 33 are formed corresponding sockets for engagement with the clutches 28 and 29, respectively, so that drive transmission downward through the vertical drive shaft 21 is communicated to sprocket pinions 34 and 35, in a manner to be more fully described hereinafter.

Extending from the sprocket pinions 34 and 35 to sprockets mounted on the forward car body axle are sprocket chains, one of which is designated by the numeral 36 in Fig. 1, said sprocket chains serving to communicate drive to the treads 2 and 3 in the conventional manner.

Surrounding the brake drum 33 a brake band 37 is provided, the mounting of which brake band is more clearly shown in the detailed view Fig. 5. The ends of the band 37 are provided with projected lugs 38 and 39 in which there are mounted transverse pins 40 and 41, respectively. The transverse pins 40 and 41 in turn make a loose-fitting lost-motion engagement with anchor links 42 and 43, which are provided with elongated holes, indicated clearly by dotted lines in Fig. 5. Pivotally mounted upon the pins 40 and 41 are the levers 44 and 45, the inner free ends of which are pivotally jointed by the connecting strut 46. The outer free end of lever 45 pivotally engages adjustable trunnion block 47, which is pivotally secured, as shown, to the connecting-rod 48. The outer free end of lever 44 makes pivotal connection with the elbow of bell-crank 49, which crank joins pivotally with the connecting rod 48, as shown. The opposite free end of crank 49 is pivotally engaged by the radial thrust link 50, the latter serving to join the crank 49 to the rocker-arm 51 mounted upon shaft 52.

It will be observed that the contraction of band 37 against the drum 33 to cause application of the brake will occur when shaft 52, as shown in Fig. 5, is rotated in a counterclockwise direction. One of the means for causing such motion appears clearly in Fig. 5 and consists of an hydraulic cylinder 54 having a plunger 55 in pivotal engagement with the rocker 56, the latter being mounted upon the rocker shaft 57, as shown. A rocker 58, also mounted upon shaft 57, pivotally engages the thrust-link 59, as shown. In the end of the thrust-link 59 an elongated hole 60 is provided, as appears in Fig. 5, and this slot or elongated hole 60 makes lost motion engagement with the pin 61 mounted in the end of the rocker 51. When hydraulic fluid is supplied under pressure to the cylinder 54, rocker 51 is thrust in a counterclockwise direction, thus applying the brake. It will also be noted that the shaft 52 may be turned counterclockwise by other means, to be described, without dislocation of the hydraulic brake-applying parts by reason of the lost-motion connection.

The anchor links 42 and 43 previously described are furnished with a secure mounting upon the cross-rod 53 located as shown in Figs. 3 and 4.

By reason of the method of anchorage of the ends of band 37 and the radial disposition of the link 50, a braking effect of equal intensity may be obtained with the drum 33 rotating in either direction.

The shaft 52 through which brake-applying effort is transmitted, serves as a means for delivering to the brake a brake-applying movement from two independent sources. It will be noted in Figs. 3 and 4 that the shaft 52 is journalled in parts rigidly associated with the car body and carries a rocker arm 61 at its inner end. The rocker arm 61 is pivotally connected to a depending link 62 having an elongated lost-motion hole 63 at its lower end. The elongated hole 63 in turn engages a pin carried in the end of rocker 64 which is mounted upon the shaft 65, these parts being shown more in detail in Fig. 6. The shaft 65 is mounted in journals secured to the car body 1, as shown, and carries near its inner end a vertical cam follower arm 66, the upper end of which carries a roller 67 which is arranged for movement in a channel-shaped camway 68 in the inverted cam 69, which is mounted to turn on a bushing surrounding the gudgeon 16.

The cam 69 is shown more in detail in Fig. 2 where it clearly appears with gear teeth surrounding the periphery thereof. A pinion 70, shown in Fig. 2 and hidden in the remaining views, meshes with the teeth surrounding the cam 69 and is mounted upon a shaft, not shown, extending into the interior of control cab 14, where the same may be rotated by the operator to controllably position the cam 69. Movement of the cam 69 causes the cam follower 66 and the shaft 65 upon which it is mounted to be rotated, thus moving the rocker 64 to cause rotation of shaft 52 and application of the brake. It is apparent, however, that the elongated hole 63 in the link 62 will permit the shaft 52 to be independently rotated to apply the brake by means of the hydraulic cylinder 54.

Also mounted upon shaft 65 to turn therewith is the clutch-controlling rocker 71, which is bifurcated in form, carrying between the two ends a trunnion block 72 which makes sliding engagement with a rod 73, the upper end of which is pivotally connected, as shown, with the rocker 74. The trunnion block 72 is spring-backed by the spring 75 so that counterclockwise rotation of rocker 71, as viewed in Fig. 6, imposes tension upon the rod 73 to a degree controlled by the compression of spring 75. This tension tends to move the rocker 74, which in turn is mounted upon the transverse clutch-shifter shaft 76 which is mounted to turn in trunnions rigidly attached to the car body 1. The clutch-shifter shaft 76 carries a clutch-shifter fork 77 which engages a groove provided for that purpose in the hub of the inner dog-clutch member 29. By reason of this association of parts, movement of the shaft 65 by the cam follower 66 in a direction releasing the brake results in a movement of the dog-clutch 29 into engagement with the associated driven clutch member 78. The spring 75 serves to accommodate for the lack of registry of the dog-clutch parts until engagement of the same may take place.

Oppositely positioned on the other side of the car body 1 is a corresponding arrangement of similar parts under control of the cam follower 79 and the hydraulic cylinder 80, these parts being a complete duplicate of the parts above described on the opposite side of the machine and therefore they are not described in detail.

By inspection of Fig. 2 it will appear that the shape of the cam channel 68 is such that the cam 69 may be positioned with respect to the car body so as to cause engagement of both brakes and release of both clutches. It can also be positioned to cause release of one brake and engagement of its corresponding clutch while at the same time the opposite brake is applied and its corresponding clutch released. The cam 69 may also be positioned to invert the engagement and applications of brakes and clutches just described and, also, the cam 69 may be positioned to engage both clutches and release both brakes. In this manner stoppage, direct movement, or turning in either direction may be accomplished by proper positioning of the cam 69 and these movements and controls can be executed and selected without effect upon the hydraulic brake-applying cylinders 54 and 80. It will be apparent, however, that in order to bring about selection of controls desired through rotation of the pinion 70, a considerable amount of time may be required, depending upon the position of the cam 69 at the time the selection is to be made.

Hydraulic control impulses for the cylinders 54 and 80 are communicated from the control cab through a system of conduits in hydraulic connection with one another. The system consists of branches 81 and 82 leading respectively from cylinders 54 and 80 to the central T connection 83. From the T 83 vertical conduit 84 rises through the bore of hollow vertical drive shaft 21. At the upper end of vertical conduit 84 is a swing-joint or stuffing-box 85, the same being mounted upon bracket 86 attached to a permanent part of the control cab 14. From the swing-joint 86 conduit 87 passes to the interior of a control-box 88 to pressure-generating means described below.

Within the control-box 88, as shown clearly in Fig. 7, there is mounted a pressure-generating cylinder 89 of any suitable form. Appropriate linkage 90 joins the cylinder 89 with a treadle 91 so that an operator may actuate the cylinder 89 with his foot. The conduit 87 hydraulically connects with the cylinder 89 through a check-valve 92 having a valve-controlled by-pass 93 which may be opened and closed by means of the handle 94.

In operation the apparatus above described is particularly useful, for example, when an excavating machine is periodically moving forward toward its work. Under these conditions the cam 69 is positioned for forward travel and while working the clutch 23 is disengaged and the by-pass valve 93 is closed to retain previously applied pressure in the hydraulic system. This causes the brakes to be applied and the tractor car body held against movement while digging takes place. When it is necessary to move the machine forward, control handle 94 is moved to open the by-pass 93, thus releasing the brakes and the clutch 23 is engaged for forward movement. These operations are simple and quickly executed and as soon as the machine reaches its new position the by-pass valve 93 is closed, the clutch 23 disengaged, and the brakes applied by pressure exerted upon the treadle 91. This operation likewise is simple and quickly executed. Under ordinary conditions, without the apparatus of this invention, it would be necessary to reposition the cam 69, a time-consuming operation, if equivalent results were to be obtained. As a result this invention permits a substantial increase in the capacity of a power excavator. Furthermore, in case the excavator is travelling down a steep incline and tends to acquire an excessive speed, the brakes may be immediately applied by force exerted upon the treadle 91 without the delay involved in repositioning cam 69. The direct and rapid control of brakes provided by the apparatus of this invention furthermore is accomplished with little or no encumbrance of the mounting and drive means and remains continuously connected and in condition for operation at all times.

It is intended that the protection of Letters Patent to be granted hereon extend to the full limit of the inventive advance disclosed herein as defined by the claims hereto appended.

What I claim as my invention is:

1. In a driving, steering, and braking system adapted for use in a car body having right- and left-hand endless tractor treads and a hollow center gudgeon upon which there is rotatably mounted a control and driving cab, the combination comprising a hollow vertical driving shaft mounted within said gudgeon, right and left means for establishing and releasing driving connection between said driving shaft and said respective treads, right and left brakes mounted in braking relation to said respective tractor treads, right and left interconnecting means between said brakes and their respective releasing and driving means, said interconnecting means being adapted to release said driving connection when said brakes are applied and to release said brakes when said driving connection is established, a cam plate surrounding said center gudgeon, rotatably positionable with respect to said car body, means associated with said rotating cab for controllably positioning said cam with respect to said car body, right and left cam followers cooperatively connecting said cam with said interconnecting means respectively to cause the same to actuate said brakes and said drive establishing a releasing means in response to movement imposed by said cam, said cam having a zone for application of both brakes, a zone for release of both brakes and establishment of driving connection with both treads, a zone for braking one tread and driving the other, and a zone for release of the opposite brake and driving of the opposite tread, lost motion linkages within said interconnecting means for permitting said brakes to be applied without movement of said cam followers, additional means for applying said brakes hydraulically, said additional hydraulic means being connected to said brakes by additional lost motion linkages for permitting application of said brakes by said interconnecting means without movement of said additional hydraulic means, a conduit for transmission of brake-applying impulses to said hydraulic means disposed within said hollow vertical driving shaft, a swing-joint in said vertical conduit, an hydraulic impulse-generating means mounted on said rotating cab, and means providing hydraulic connection between said hydraulic impulse-generating means and said swing-joint.

2. In a driving, steering, and braking system adapted for use in a car body having right- and left-hand endless tractor treads and a hollow center gudgeon upon which there is rotatably mounted a control and driving cab, the combination comprising a hollow vertical driving shaft mounted within said gudgeon, right and left means for establishing and releasing driving connection between said driving shaft and said respective treads, right and left brakes mounted in braking relation to said respective treads, right and left interconnecting means between said brakes and their respective releasing and driving means, said interconnecting means being adapted to release said driving connection when said brakes are applied and to release said brakes when said driving connection is established, a cam plate surrounding said center gudgeon rotatably positionable with respect to said car body, means associated with said rotating cab for controllably positioning said cam with respect to said car body, right and left cam followers cooperatively connecting said cam with said interconnecting means respectively to cause the same to actuate said brakes and said drive establishing a releasing means in response to movement imposed by said cam, said cam having a zone for application of both brakes, a zone for release of both brakes and establishment of driving connection with both treads, a zone for braking one tread and driving the other, and a zone for release of the opposite brake and driving of the opposite tread, lost motion within said interconnecting means for permitting said brakes to be applied without movement of said cam followers, independent hydraulic means for applying said brakes, said independent hydraulic means being provided with lost-motion means for permitting application of said brakes without movement of said independent hydraulic means, a conduit for transmission of brake-applying impulses to said independent hydraulic means, said conduit being centrally disposed within said vertical driving shaft, a swing-joint in said vertical conduit, an hydraulic impulse-generating means mounted on said rotating cab, and means providing hydraulic connection between said hydraulic impulse-generating means and said swing-joint.

3. In a driving, steering, and braking system adapted for use in a car body having right- and left-hand endless tractor treads and a hollow center gudgeon upon which there is rotatably mounted a control and driving cab, the combination comprising a hollow vertical driving shaft mounted within said gudgeon, means for steering, driving, and braking said treads, means exterior to said gudgeon and concentric therewith controllable from within said cab for controlling said steering, driving, and braking means, and hydraulic brake-applying means mounted on said car body independent of said first-mentioned braking means for applying a braking action to said treads, a conduit for transmission of brake-applying impulses to said hydraulic braking means disposed within said hollow vertical driving shaft, a swing-joint in said vertical conduit, an hydraulic impulse-generating means mounted on said rotating cab, and means providing hydraulic connection between said hydraulic impulse-generating means and said swing-joint.

4. In a driving, steering, and braking system adapted for use in a car body having right- and left-hand endless tractor treads and a hollow center gudgeon upon which there is rotatably mounted a control and driving cab, the combination comprising a hollow vertical driving shaft mounted within said gudgeon, means for steering, driving, and braking said treads, means exterior to said gudgeon and concentric therewith controllable from within said cab for controlling said steering, driving, and braking means, and hydraulic brake-applying means mounted on said car body independent of said first-mentioned braking means for applying a braking action to said treads, a conduit for transmission of brake-applying impulses to said independent hydraulic means disposed within said vertical driving shaft, a swing-joint in said vertical conduit, an hydraulic impulse-generating means mounted on said rotating cab, connector means providing hydraulic connection between said hydraulic impulse-generating means and said swing-joint, and a check-valve having a hand-controllable by-pass hydraulically interposed in said connector means so as to releasably maintain a brake-applying impulse.

5. In a brake adapted to be independently actuated by two independent actuating means, the combination comprising a drum having an external braking surface, an anchor post parallelly disposed with reference to the axis of said drum and positioned alongside of the same, a friction-band encircling said drum, means including transverse pins forming a limited free-motion connection between the two ends of said band and said anchor post, means for causing said transverse pins to approach one another and to contract said band against said drum, said contraction-causing means including a link disposed in substantially radial relation to said drum, means for causing said link to move in a radial direction to cause application of said brake, a rocker-shaft having an arm engaging said link for causing the same to move in a substantially radial direction, said rocker-shaft having a second rocker-arm engaged by a second link adapted to act under tension to apply said brake, said tension link having a lost-motion engagement with said second rocker-arm, and a third rocker-arm on said rocker-shaft engaged by a compression link adapted to act under compression to apply said brake, said compression link having a lost-motion engagement with said third rocker-arm whereby said brake may be applied by motion imparted by either said compression link or said tension link without movement of the other.

6. In a brake, the combination comprising a drum having an external braking surface, an anchor post parallelly disposed with reference to the axis of said drum and positioned alongside of the same, a friction-band encircling said drum, means including transverse pins forming a limited free-motion connection between the two ends of said band and said anchor post, means for causing said transverse pins to approach one another to contract said band against said drum, said contraction-causing means including a link disposed in substantially radial relation to said drum, and means for causing said link to move in a radial direction to apply said brake.

7. In a brake, the combination comprising a drum having an external braking surface, a brake-band anchor, a brake-band surrounding said drum and loosely anchored at its two ends to said anchor, a lever pivotally connected near its center to one end of said band, a second lever pivotally connected near its center to the other end of said band, a strut pivotally connected to corresponding free ends of said levers for maintaining the spaced relationship between said ends fixed, a toggle linkage cooperatively engaging the other free ends of said levers for causing the same to approach one another and to contract said band, said toggle linkage including an operating arm having an operating end movable within its operable range along a path having its principal component rotatable with respect to said drum, and an operating link pivotally engaging the free end of said arm disposed in substantially radial relationship to said drum.

8. In a brake and clutch system suitable for steering and braking of track-tread tractors, the combination comprising a driving shaft, a driven member adapted to drive a tractor tread, a clutch between said shaft and said driven member for establishing and releasing driving connection therebetween, a brake drum secured to said driven member, a brake-shoe adapted to make contact with said drum, a brake-applying member pivotally associated with said shoe for causing the latter to engage said drum, a first brake actuator adapted to impart brake-applying movement to said brake-applying member, a second brake actuator adapted to impart brake-applying movement to said brake-applying member, said brake actuators being adapted to independently move said brake-applying member without causing movement of one another, and a clutch-shifter cooperatively connected to said second brake actuator to move in consonance therewith to shift said clutch into engagement when said second brake actuator is in brake-releasing position and to shift said clutch out of engagement when said second brake actuator is in brake applying position.

9. In a clutch brake system adapted for use in steering and braking track type tractors, the combination comprising a pair of drivable tractor treads, a driving shaft, a clutch for each of said treads for establishing driving connection between the same and said driving shaft, a brake-drum for each of said treads mounted to turn when said treads are driven, a brake-shoe for each of said drums, a brake-applying member for each of said shoes for causing the same to engage said drums respectively, means for applying and releasing said brakes and engaging and releasing said clutches alternately, control means positionable to engage and disengage said brakes and clutches to cause said treads to execute steering and driving movement, and independent hydraulic means for causing said shoes to engage said drums independently of the position of said control means.

10. In a car body for track type tractor treads having a rotatable control and driving cab mounted thereon, the combination comprising clutch and brake means cooperatively engaging the treads of said car body to cause the same to execute steering and driving movements, control means positionable to actuate said clutch and brake means having a control connection with the interior of said cab non-concentrically located with reference to the axis of rotation of said cab, and an hydraulic conduit substantially coaxial with the axis of rotation of said cab for transmitting an hydraulic control impulse from the interior of said cab to said brake means independent of the position of said positionable control means.

11. In a car body for track type tractor treads driven and steered by clutches and brakes controlled from within a rotatable cab mounted upon said car body, the combination comprising an hydraulic pressure-generating means mounted upon said control cab, an hydraulic impulse-transmitting conduit connected thereto and extending to a point in substantial alignment with the axis of rotation of said cab, thence downwardly to a point within said car body, a rotatable swing-joint in said conduit, an hydraulic brake actuator for each of said brakes on said car body, and means forming hydraulic connection between the same and said conduit.

12. In a car body for track type tractor treads driven and steered by clutches and brakes, upon which car body there is mounted a rotatable control and drive cab, the combination comprising hydraulic pressure-generating means mounted on said cab, hydraulic brake-applying means mounted on said car body cooperatively engaging said brakes, a conduit connecting said brake-applying means to said hydraulic pressure-generating means, a portion of said conduit being disposed in substantially axial alignment with the axis of rotation of said cab, a check-valve in said conduit for maintaining a brake-applying impulse by resisting return flow of hydraulic fluid in said conduit, and a valve-controlled by-pass making hydraulic connection with the two sides of said check-valve for releasing said brake-applying impulses.

13. In an excavator having a track type tractor tread car body and a rotatable control and driving cab mounted thereon, the combination comprising driving and steering means for said treads, and hydraulic means independent of said driving and steering means controllable from within said cab through an hydraulic conduit a portion of which is in substantial alignment with the axis of rotation of said cab for fixing said treads against movement in either direction when said excavator is digging.

HENRY C. HETTELSATER.